United States Patent [19]

van den Berg

[11] 4,391,015

[45] Jul. 5, 1983

[54] PIVOT CONNECTION FOR WIPER BLADES

[75] Inventor: Johan H. van den Berg, Hasselt, Belgium

[73] Assignee: Champion Spark Plug Europe S.A., Binche, Belgium

[21] Appl. No.: 313,639

[22] Filed: Oct. 22, 1981

[30] Foreign Application Priority Data

Oct. 27, 1980 [FR] France .................. 80 22923

[51] Int. Cl.³ ............................................. B60S 1/38
[52] U.S. Cl. ............................ 15/250.42; 15/250.32
[58] Field of Search ................... 15/250.32–250.42

[56] References Cited

U.S. PATENT DOCUMENTS

| | | |
|---|---|---|
| 1,568,447 | 5/1980 | Bosch . |
| 2,234,709 | 4/1941 | Rodrick . |
| 2,309,043 | 2/1975 | Bauer et al. . |
| 3,031,709 | 5/1962 | Easterling . |
| 3,254,358 | 6/1966 | Wise . |
| 3,408,679 | 11/1968 | Deutscher et al. .......... 15/250.42 X |
| 3,644,957 | 2/1972 | Deibel et al. ................ 15/250.42 |
| 3,866,260 | 2/1975 | Cone . |
| 3,877,106 | 4/1975 | Bauer et al. . |
| 3,925,844 | 12/1975 | Cone . |
| 4,017,936 | 4/1977 | Schweikert . |
| 4,137,598 | 2/1979 | Sharp . |

Primary Examiner—Peter Feldman
Attorney, Agent, or Firm—Wood, Dalton, Phillips, Mason & Rowe

[57] ABSTRACT

A pivot connection is provided between two yokes of a wiper blade or between a wiper arm and one yoke of a wiper blade wherein the cross-section of a first metallic yoke has substantially the form of an inverted U and has at least one transverse pivot pin formed from a tongue cut in the web of said first yoke. A second yoke has an attaching element capable of cooperating with the transverse pivot pin and comprises an open cylindrical seat surrounded, parallel to its longitudinal axis, by one or more hooks capable of maintaining the second yoke rotatably attached to the pivot pin of the first yoke. The attaching element may be integrally formed with, snap-fitted on or moulded to the second yoke.

9 Claims, 24 Drawing Figures

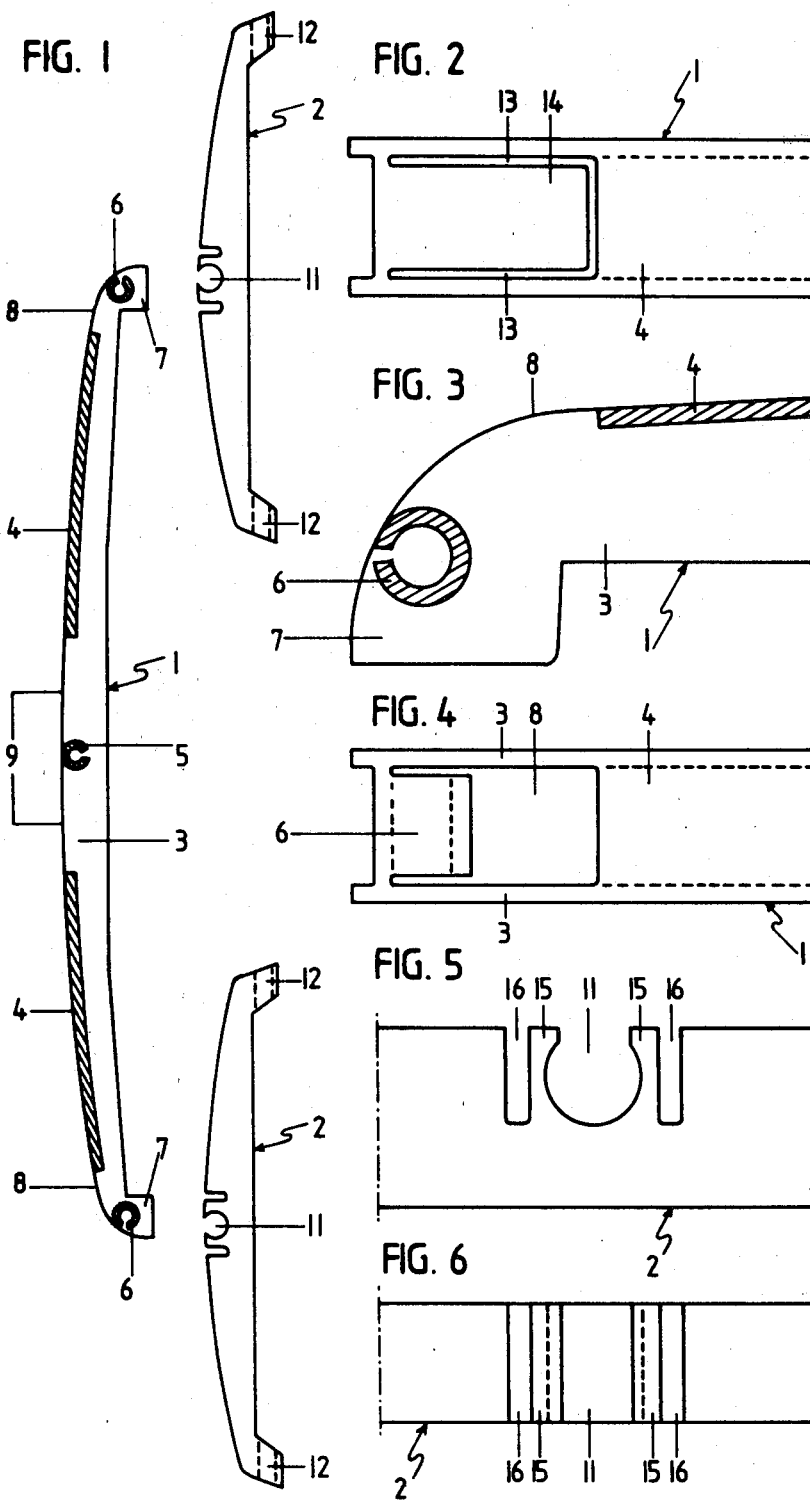

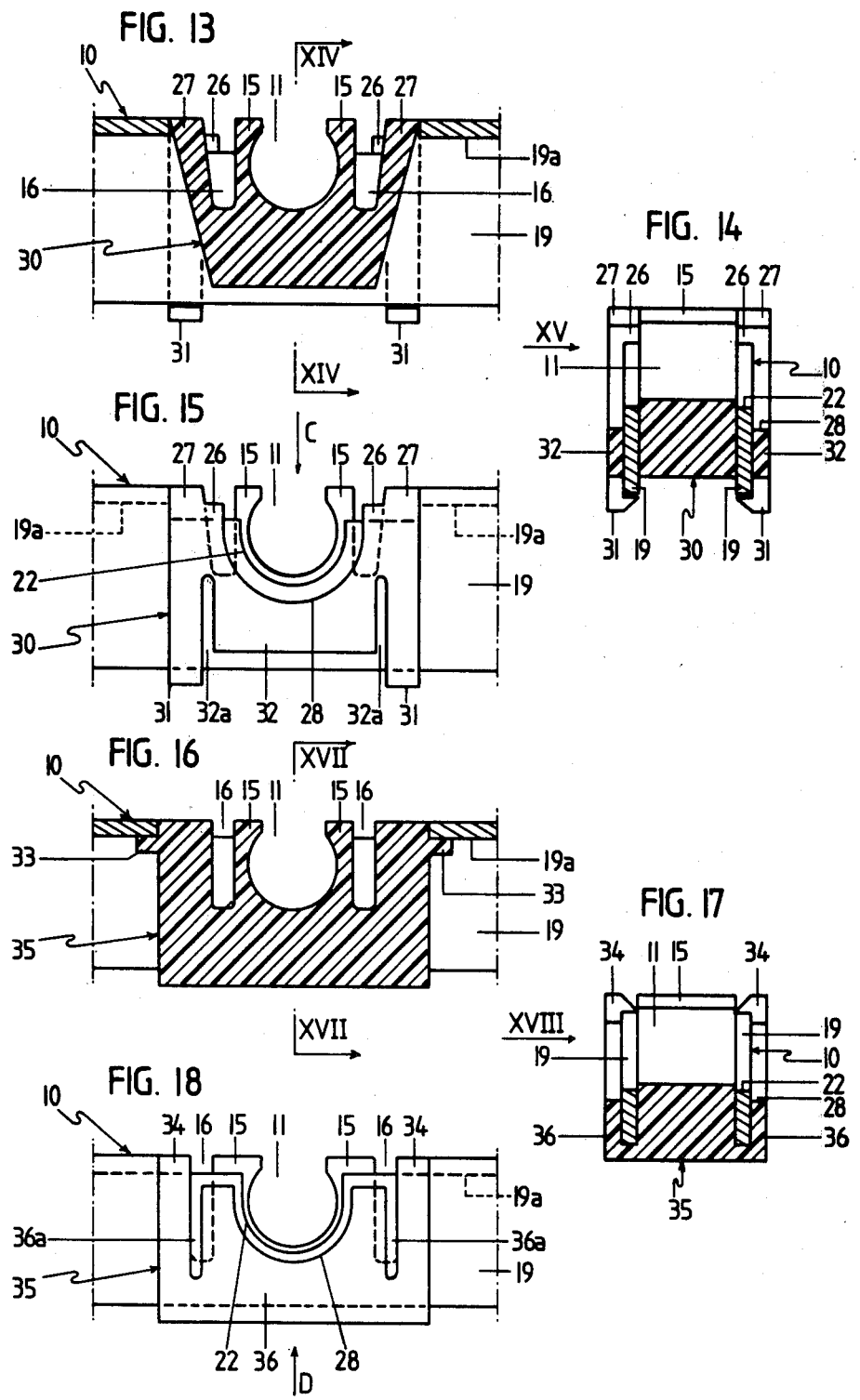

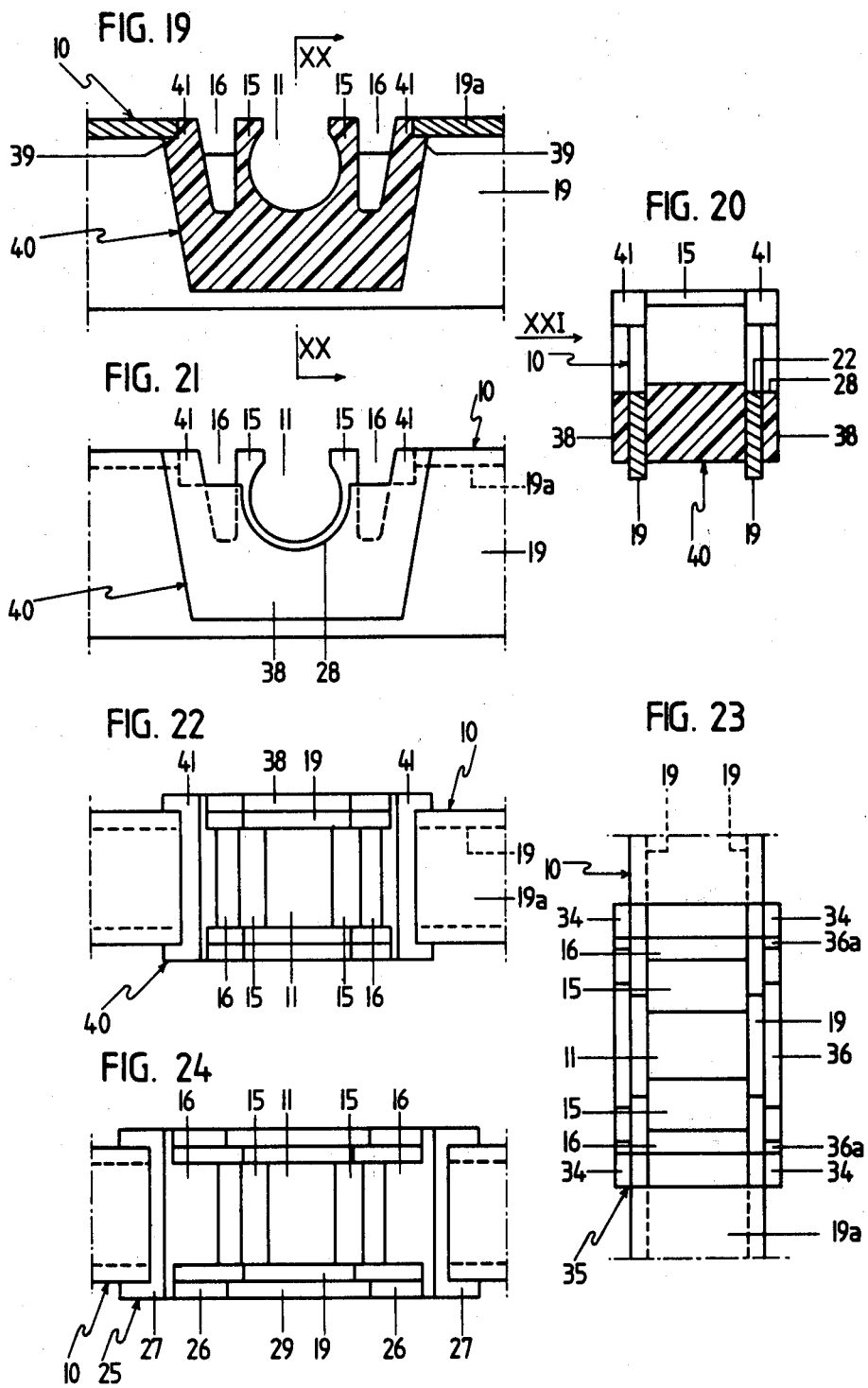

PIVOT CONNECTION FOR WIPER BLADES

DESCRIPTION

1. Technical Field

The present invention is directed to windshield wiper blades and more particularly to the pivot connections between the articulated elements of a windshield wiper blade and between the windshield wiper blade and a wiper arm.

2. Background Art

The present invention relates to a pivot connection for two yokes of a wiper blade wherein the cross-section of a first metallic yoke has substantially the form of an inverted U and comprises at its two extremities, as well as in its central portion, a transverse pivot pin and wherein a second yoke comprises attaching means capable of cooperating with one or the other of said pivot pins. Such devices are for example used on motor vehicles.

Wiper blades with a superstructure which comprises a metallic main yoke, or bridge, provided at its two extremities with a transverse pivot pin, are very well known in prior art. In practically all cases said pivot pins are embodied in the form of a rivet which passes through the main yoke as well as through the secondary yokes. In such wiper blades the attaching means for rotatably securing the secondary yokes to said rivets are such that the riveting operation can only be done after said secondary yokes have been mounted onto the main yoke and the secondary yokes cannot be dismounted from the main yoke without first destroying said rivets. A pivot connection of this type is for example disclosed in British Pat. No. 1,358,149 corresponding to U.S. Pat. No. 3,864,783.

DISCLOSURE OF THE INVENTION

The object of the present invention is to provide a wiper blade which does not comprise any rivet, or at least no rivets at the two extremities of the main yoke. A certain number of disadvantages of the rivets, more particularly as to mounting/manufacturing, will thus be eliminated.

The pivot connection according to the invention is characterized by the fact that the two pivot pins at the extremities of the first yoke are formed from a tongue cut in the web of said yoke.

According to a first embodiment of the invention, wherein the second yoke is made out of an appropriate plastic material, the attaching means of said yoke comprise an open cylindrical seat surrounded, parallel to its longitudinal axis, by one or more hooks capable of maintaining this second yoke rotatably attached to one or the other pivot pin of the first yoke.

According to other embodiments, wherein the second yoke is made out of an appropriate metallic material, a plastic part provided with said attaching means is snap-fitted or moulded into an opening provided on top of said second yoke.

Other characteristics of the invention will be better understood when reading the following portions of the specification in conjunction with the accompanying drawings.

BRIEF DESCRIPTION OF THE DRAWINGS

FIG. 1 schematically shows a main yoke in a longitudinal sectional view and two secondary yokes in a side elevational view, in accordance with a first embodiment of the invention;

FIG. 2 is a plan view of the tongue cut in the web of the main yoke;

FIG. 3 is a transverse sectional view of the tongue bent to form a cylinder shaped pivot pin;

FIG. 4 is a plan view of FIG. 3;

FIG. 5 shows the detail of the attaching means of the two secondary yokes of FIG. 1;

FIG. 6 is a plan view of FIG. 5;

FIG. 13 is a longitudinal section of the secondary yoke according to a fourth embodiment of the invention;

FIG. 14 is a sectional view along line XIV—XIV of FIG. 13;

FIG. 15 is an elevational view according to arrow XV of FIG. 14;

FIG. 16 is a longitudinal section of the secondary yoke accordng to a fifth embodiment of the invention;

FIG. 17 is a sectional view along line XVII—XVII of FIG. 16;

FIG. 18 is an elevational view according to arrow XVIII of FIG. 17;

FIG. 19 is a longitudinal section of the secondary yoke according to a sixth embodiment of the invention;

FIG. 20 is a sectional view along line XX—XX of FIG. 19;

FIG. 21 is an elevational view according to arrow XXI of FIG. 20;

FIG. 22 is a plan view of FIG. 21;

FIG. 23 is a plan view of FIG. 18;

FIG. 24 is a plan view of FIG. 12.

BEST MODE FOR CARRYING OUT THE INVENTION

Figure 7:
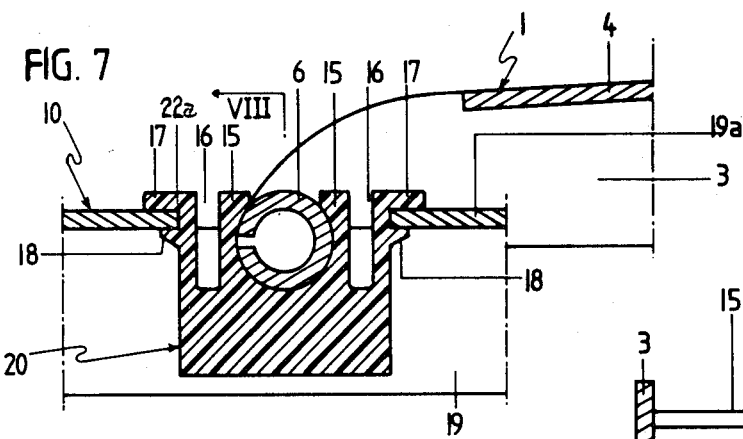
FIG. 7 is a longitudinal section (with respect to the two yokes) showing a second embodiment of the invention.

FIG. 1 schematically shows a main metallic yoke 1, of which the transverse section has substantially the form of an inverted U, and two plastic secondary yokes 2, in accordance with a first embodiment of the invention.

The main yoke 1 comprises a web 4 and two flanges 3 provided with an enlargement 7 at their two extremities. It further comprises a transverse pivot pin 5 in its central portion and a transverse pivot pin 6 at each of its two extremities. Near said three pivot pins 5,6 corresponding openings 8,9 are provided in the web 4.

On either of their extremities the secondary yokes 2 are provided with claws 12 by means of which they are secured to the properly so called wiper element (not shown). In their central portion said secondary yokes 2 are provided with attaching means comprising an open cylindrical seat 11 capable of cooperating with one or the other of said three pivot pins 5,6. The two secondary yokes 2 shown on FIG. 1 may be relatively rigid if they cooperate with the two pivot pins 6. In this case the pivot pin 5 will receive, as shown in prior art, a wiper arm capable of imparting an oscillating movement to the wiper blade.

However, besides the two relatively rigid yokes 2 which cooperate with the two pivot pins 6, a third yoke (not shown) may be attached to the central pivot pin 5 and which, in order to have a good pressure distribution on any curved surface to be wiped, would be made out of relatively resilient plastic material. In this case the pivot pin 5 would be a normal rivet and the wiper arm would be pivotally attached to the rivet by means of a saddle-shaped connector well known in prior art.

FIGS. 2 to 4 show how the two pivot pins 6 are formed from a tongue 14 severed by cut 13 from the web 4 of the main yoke 1, with FIG. 2 showing the tongue 14 cut in the web 4 before forming the pivot pin 6 and with FIGS. 3 and 4 showing the same tongue after the pivot pin 6 has been formed. The openings 8 in the web 4 correspond to the dimensions of the tongue 14 before forming the pivot pin 6.

In the different embodiments described hereunder said pivot pins 5,6 may be manufactured as indicated above, they may also consist of a normal rivet if the main yoke is a steel yoke and they may be moulded in one piece with the main yoke if said yoke is a plastic one.

Continuing the description of the first embodiment of the invention; i.e., more particularly the first embodiment of the secondary yokes 2, these yokes are completely moulded in a plastic material and comprise, at their upper central portion (FIGS. 5 and 6), an open cylindrical seat 11 of which the diameter substantially corresponds to the diameter of the pivot pins 5,6. The cylindrical seat is surrounded, parallel to its longitudinal axis, by one or more hooks 15 capable of maintaining said yoke 2 on one or the other of the pivot pins 5,6 of the main yoke. The resiliency of the hooks 15 is aided by transverse slots 16.

Figure 8:
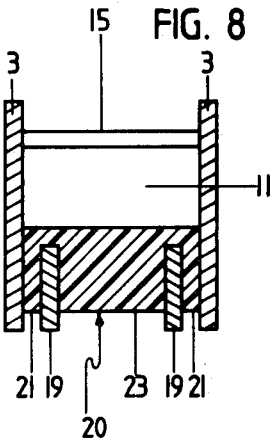
FIG. 8 is a partial section along line VIII—VIII of FIG. 7.
Figure 9:
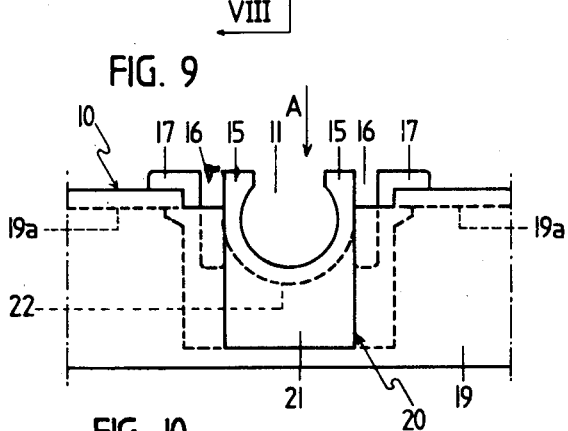
FIG. 9 is an elevational view of the secondary yoke of FIG. 7.
Figure 10:
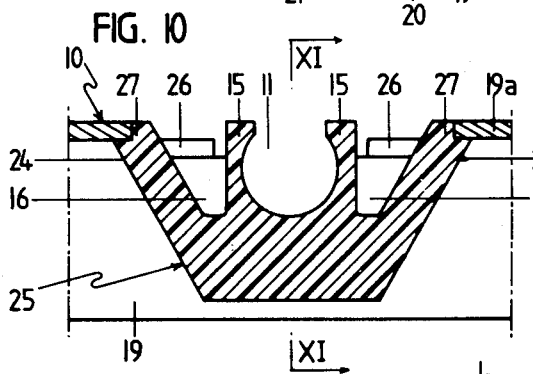
FIG. 10 is a longitudinal section of the secondary yoke according to a third embodiment of the invention.
Figure 11:
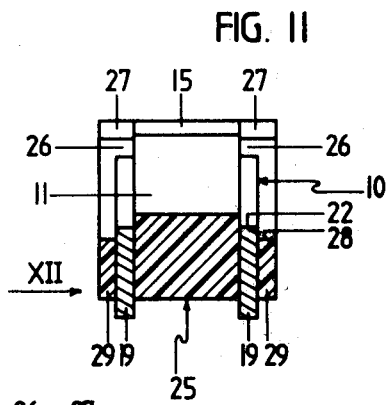
FIG. 11 is a sectional view along line XI—XI of FIG. 10.
Figure 12:
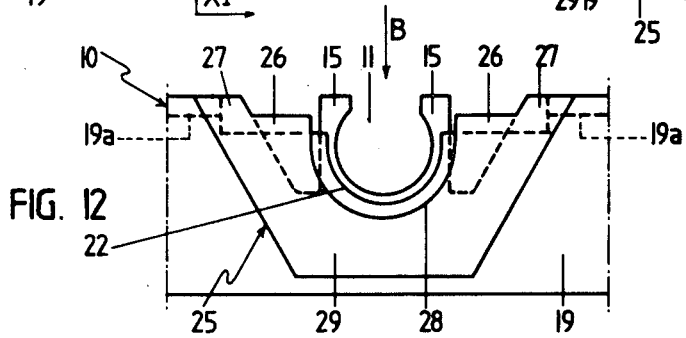
FIG. 12 is an elevational view according to arrow XII of FIG. 11.

FIGS. 7 to 9 show a second embodiment of the invention wherein a secondary yoke 10 is made out of an appropriate metallic material, its transverse section having substantially the form of an inverted U, with two flanges 19 and a web 19a. A plastic part 20 provided with the same attaching means as heretofore; i.e., the cylindrical seat 11, the hooks 15 and the slots 16, is inserted into an opening 22a provided in the web 19a and openings 22 in the two flanges 19 of the secondary yoke 10. The opening 22a and openings 22 are one continuous opening from side to side and across the web of the yoke.

On FIG. 8, wherein the pivot pin 6 is not shown, it can be seen that said plastic part 20 has substantially the form of an E, the two flanges 19 of the secondary yoke 10 being embedded between the three limbs 21,23,21 of the E. Any metal to metal contact between the main yoke 1 and the secondary yoke 10 is thus impossible.

The mounting of the secondary yoke 10 on the pivot pin 6 of the main yoke 1 is done as follows: the plastic part 20 is pushed downwards (arrow A) into the opening 22a provided in the web 19a of the secondary yoke 10 so that the two flanges 19 of said yoke 10 are inserted into the slots between the three limbs 21,23,21 (FIG. 8) of the E-shaped plastic part. The hooks 18 and the stops 17 snap onto the web 19a of the yoke 10 and keep said plastic part 20 in place. The yoke 10 is then secured to the main yoke 1 by having the hooks 15 snap onto the pivot pin 6. A pivot connection avoiding any metal to metal contact between the main yoke 1 and the secondary yoke 10 has thus been provided.

FIGS. 10 to 12 and FIG. 24 show a third embodiment of the invention wherein the secondary yoke 10 is also U-shaped and made out of an appropriate metallic material. The way to assemble the two yokes 1,10 is the same as before; i.e., a plastic part 25 is inserted downwards (arrow B) into an opening provided in the web 19a of the secondary yoke 10. Any displacement of the plastic part 25 with respect to the secondary yoke 10 is prevented by the stops 26 resting on the upper edge of the two flanges 19, by the stops 27 resting on the upper edge of the two flanges 19 and against the transversal edge of the web 19a, and by the hooks 24 resting against the internal surface of the web 19a of the secondary yoke 10.

The secondary yoke 10 is then mounted onto the pivot pin 6 of the main yoke 1 by means of the hooks 15. The metal to metal contact between the main yoke 1 and the secondary yoke 10 is prevented by the flanges 29 of the plastic part 25 and by the substantially semicircular openings 22 provided in the flanges 19. Similar substantially circular openings 28 are provided in said plastic part 25.

FIGS. 13 to 15 show a fourth embodiment of the invention which is very similar to the embodiment of FIGS. 10 to 12, and 24, said last figure being the same in the two cases, except for the dimensions of the plastic parts 25,30. In this fourth embodiment the plastic part 30 is also inserted downwards (arrow C) into the opening provided in the web 19a of the secondary yoke 10, but hooks 31 are provided which prevent any vertically upward displacement with respect to the yoke 10 by gripping on the lower edges of the flanges 19 of said secondary yoke 10 (FIG. 13) and not on the internal surface of the web 19a as in FIG. 10. Just as in the preceding embodiment the metal to metal contact is not possible because of the two flanges 32 of the plastic part 30 overlapping the outside of the flanges 19. In order to increase the resiliency of the hooks 31, slots 32a are provided in said flanges 32.

FIGS. 16 to 18 and FIG. 23 show a fifth embodiment of the invention which is practically the inverse of the embodiment of FIGS. 13, 14, 15; i.e., in the present case the plastic part 35 is inserted upwards (arrow D) into the opening provided in the web 19a of the secondary yoke 10 and the hooks 34, separated from the flanges 36 of said plastic part by the slots 36a, rest on the upper edges of the flanges 19 of the secondary yoke 10, whilst the stops 33 rest against the internal surface of the web 19a.

The FIGS. 19 to 22 show a sixth embodiment of the invention wherein the plastic part 40 is moulded on the secondary yoke 10, in the opening provided in the web 19a. The moulded plastic part 40 is provided with the same attaching means 11,15,16 as in the preceding embodiments and the metal to metal contact is prevented by the two flanges 38 of said plastic part 40. It is to be noted that in case the plastic part 40 is accidentally detached from the walls 19,19a of the yoke 10, it is maintained on the yoke 10 by the stops 39,41 which prevent any displacement with respect to the yoke 10.

Six embodiments of the invention have thus been described, but it is to be understood that changes and/or modifications may be made without departing from the scope of the invention such as defined in the appended claims.

I claim:

1. A pivot connection for two yokes (1,2,10) of a wiper blade wherein the cross-section of a first metallic yoke (1) has substantially the form of an inverted U comprising a web and two flanges and further comprising at its two extremities, as well as in its central portion, a transverse pivot pin extending between said flanges (6,5) and wherein a second yoke (2,10) comprises attaching means (11,15,16) capable of cooperating with one or the other of said pivot pins (6,5), characterized in that the two pivot pins (6) at the extremities of the first yoke (1) are formed from a tongue (14) cut in the web (4) of said yoke (1) and rolled to form a tubular pivot.

2. A pivot connection according to claim 1, characterized in that the central pivot pin (5) of the first yoke (1) is formed from a tongue cut in the web (4) of said yoke (1).

3. A pivot connection according to one of the claims 1 and 2, characterized in that the second yoke (2) is made out of an appropriate plastic material.

4. A pivot connection according to claim 3, characterized in that the attaching means of the second yoke (2) comprise an open cylindrical seat (11) surrounded, parallel to its longitudinal axis, by one or more hooks (15) capable of maintaining said yoke (2) rotatably attached to one or the other pivot pin (6,5) of the first yoke (1).

5. A pivot connection according to claim 1, characterized in that the second yoke (10) is made out of an appropriate metallic material.

6. A pivot connection according to claim 5 wherein the cross-section of the second yoke (10) has substantially the form of an inverted U comprising a web and two flanges, characterized in that the web (19a) of said second yoke (10) comprises an opening wherein is snap-fitted or moulded a plastic part (20,25,30,35,40) provided with said attaching means (11,15,16).

7. A pivot connection according to claim 6, characterized in that the cross-section of said plastic part (20,25,30,35,40) is substantially E-shaped so as to form three limbs, the two flanges (19) of the second yoke (2) being embedded between the three limbs (21,23,21) of the E.

8. A pivot connection according to one of the claims 6 or 7 wherein the plastic part (20,25,30,35) is snap-fitted into said opening, characterized in that said part (20,25,30,35) comprises one or more hooks (17,24,31,34) and/or stops (18,26,27,33) which prevent any displacement with respect to the second yoke (10).

9. A pivot connection according to claim 8, characterized in that said hooks (17,24,31,34) and/or stops (18,26,27,33) grip and/or rest either on the web (19a) or on the top or bottom edge of the two flanges (19) of said second yoke (10).

* * * * *